July 14, 1931.  F. T. ROBERTS, JR  1,814,570
JACK ATTACHMENT FOR AUTOMOBILES
Filed Jan. 8, 1927
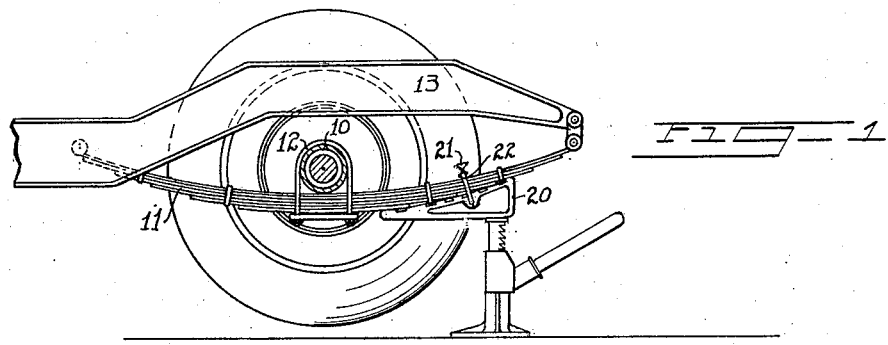
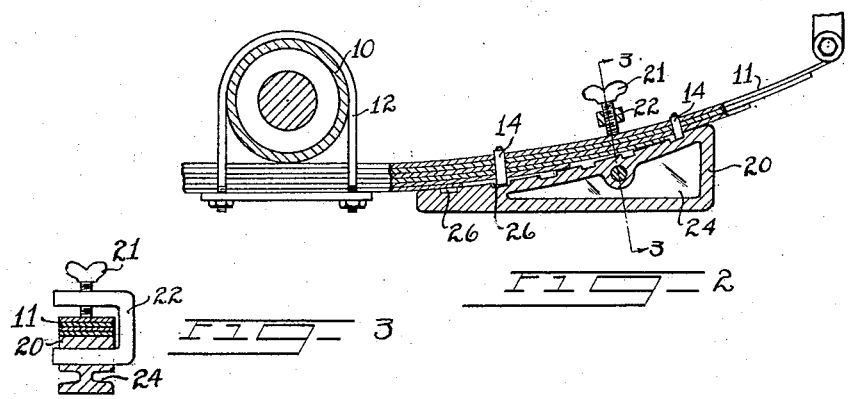
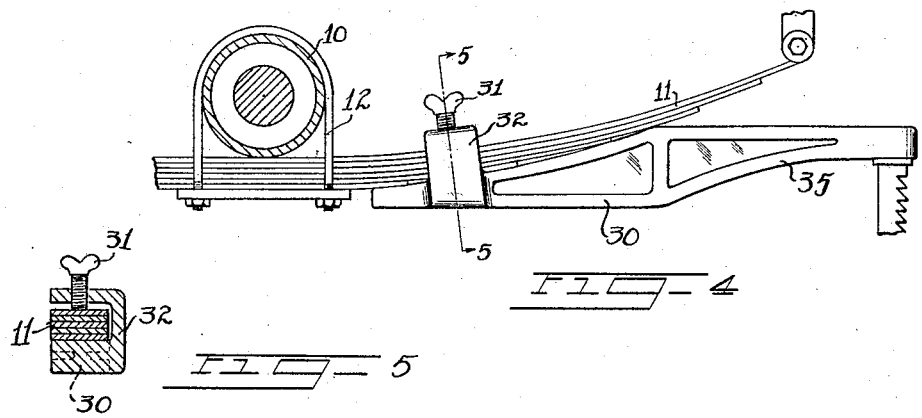
Inventor
Fred T. Roberts, Jr.
By Bates, Macklin, Gobrick & Teare
Attorneys Patented July 14, 1931

1,814,570

UNITED STATES PATENT OFFICE

FRED T. ROBERTS, JR., OF MONTCLAIR, NEW JERSEY

JACK ATTACHMENT FOR AUTOMOBILES

Application filed January 8, 1927. Serial No. 159,814.

This invention relates to a device adapted to be attached to an automobile and provide an accessible seat for the head of a lifting jack. In modern automobiles the space available for placing the jack, particularly at the rear, is very limited and what space there is is not readily accessible. One is also extremely liable to soil his garments in placing the jack under a car axle. It is not feasible to place the jack directly against the spring at any material distance from the axle for the load then becomes carried on a few leaves of the spring which are thus liable to distortion.

I have discovered that the difficulties may be avoided by providing a suitable pad clamped against the under side of the spring and extending along it a sufficient distance to overlap the ends of several leaves, so that the jack may be placed a considerable distance from the axle and in an available place beneath the spring and still not distort the spring when it lifts the car. My pad may be held in place by a readily operable clamp and thus the device may be removed when not in use. Accordingly, only one of these pads need be supplied for a car, and may be attached whenever required, and removed and stored in the car after the jacking operation.

My invention is hereinafter more fully described in connection with embodiments illustrated in the drawings. The essential novel features are set out in claims.

In the drawings Fig. 1 is a fragmentary side elevation of an automobile provided at the rear with one form of my jack attachment; Fig. 2 is a longitudinal vertical section on a larger scale of this form jack attachment; Fig. 3 is a cross section on the plane indicated by the line 3—3 on Fig. 2; Fig. 4 is an elevation of a modified form of my attachment; Fig. 5 is a cross section on a plane indicated on the line 5—5 on Fig. 4.

Referring first to Figs. 1, 2 and 3, 10 designates the rear axle housing; 11, the adjacent rear spring of an automobile, shown as secured in place by the usual U-bolts 12; 13 indicates the chassis frame to which the ends of the spring are suitably connected.

My attachment, as shown in these figures, comprises a wedge shaped casting 20 adapted to engage the under side of the spring and a clamp secured thereto to engage the upper side. As shown, the clamp comprises a thumb screw 21 mounted in a yoke or U-shaped bar 22 which is pivoted in the web shaped block 20. The block is shown as having a hollowed out portion with a reinforcing web 24 for lightness of construction. Its upper surface is curved approximately corresponding to the under side of the spring, and in this surface is a number of transverse recesses 26 adapted to receive the usual spring clamps 14. When in place the under surface of the wedge block is substantially horizontal as shown in Figs. 1 and 2.

By carrying the clamp by a U-bar removably mounted in the block, I can mount the bar on the inner or outer side of the spring, as is more convenient. The device is intended to be stored in the car and applied whenever required. The point of application is near enough to the end of the car so the user need not soil his garments when putting it in place and clamping it to the spring. When the block is in place it is very simple to place the jack beneath it and raise the car.

Figs. 4 and 5 illustrate a modification of the wedge block. With this view the block designated 30 has the horizontal bottom and the curved top with the transverse grooves in it as before. The clamp is shown as comprising a set screw 31 mounted in a yoke forming and integral part of the block 32 which extends upwardly alongside the spring and overhangs the top thereof. A peculiar characteristic of this form of block is that it extends longitudinally a considerable distance free from the spring, as shown at 35. This extension is adapted to receive the raising member of the jack at some very accessible point. This attachment is designated for installation whenever required and is normally stored.

It is to be understood that either form of wedge block shown in Figs. 2 and 4 may be employed with either form of clamp shown, as desired.

My jack pad is simple in construction and may be readily carried in the car and may be applied whenever necessary very quickly and easily. When installed it distributes the load to the various leaves of the spring, so that the car may be jacked up by its spring without injury. Thus a jack position is provided which is a considerable distance to the inside of the wheel and beyond the axle. This location is particularly desirable when balloon tires are used, which when flat extend inwardly a considerable distance. Likewise the location of the jack in this case is outside of the region occupied by the hydraulic or mechanical brakes between the wheel and spring.

I claim:

1. An automobile jack pad comprising a block formed to engage the underside of an automobile spring, a yoke carried by said block and extending upwardly and then above the upper side of the spring while open at the opposite side, and a downwardly acting screw mounted on said yoke.

2. The combination of a wedge shaped block adapted to engage the underside of an automobile spring, a yoke secured to said block and extending upwardly along one side of the spring and then horizontally above the top of the spring and a downwardly acting thumb-screw threading in such horizontal overhang of the yoke.

3. In an automobile jack pad, the combination of a block adapted to engage the underside of an automobile spring, a U-shaped yoke opening toward the side and having its lower arm pivotally journalled in the block and a clamp screw threaded in the upper arm of said yoke.

4. In a device of the character described, the combination of a block having a curved upper surface adapted to engage the under side of a spring there being transverse recesses in the upper surface of the block, an open sided clamp for locking said device to the spring independently of the axle at some distance therefrom, there being a longitudinal rigid extension of said block projecting beneath the spring and clear of it and toward the end of the car and adapted to receive a jack head.

5. In a device of the character described, the combination of a wedge shaped block having a curved upper surface with transverse recesses therein adapted to engage the under side of a spring for a distance sufficient to overlap the ends of a plurality of spring leaves, a yoke carried by the block and extending on the upper side of said spring, a thumb screw passing downwardly through the yoke to engage the upper face of the spring at some distance from the axle, and a longitudinal rigid extension of said block projecting toward the end of the car and beneath but free from the end portion of the spring.

6. The combination with an automobile spring of a wedge-shaped block having its upper surface curved to fit the under-side of the spring, there being transverse recesses in the upper surface of the block, and means for clamping the block to the spring.

7. In an automobile jack pad, the combination of a substantially diamond-shaped block, one side of said block being adapted to engage the underside of an automobile spring, means associated with one apex of the block for securing the same to the spring, the other apex of the block being adapted to receive the head of an automobile jack.

8. The combination with an automobile spring of a wedged-shaped block, having its upper surface curved to fit the underside of the spring, an arm extending outwardly from the base of the wedged-shaped block and formed integrally therewith, said arm being adapted to receive the head of an automobile jack, and means for clamping the block to the spring.

In testimony whereof, I hereunto affix my signature.

FRED T. ROBERTS, Jr.